(12) United States Patent
Hsu (10) Patent No.: US 8,279,638 B2
(45) Date of Patent: Oct. 2, 2012

(54) OUTPUT REGULATION CIRCUIT OF A POWER CONVERTER WITHOUT CURRENT SENSING LOSS AND METHOD THEREOF

(75) Inventor: Chein-Kuo Hsu, Taichung (TW)

(73) Assignee: System General Corp., Taipei (TW)

( * ) Notice: Subject to any disclaimer, the term of this patent is extended or adjusted under 35 U.S.C. 154(b) by 605 days.

(21) Appl. No.: 11/828,930

(22) Filed: Jul. 26, 2007

(65) Prior Publication Data

US 2009/0027035 A1    Jan. 29, 2009

(51) Int. Cl.
*H02M 3/335* (2006.01)

(52) U.S. Cl. .................. 363/21.16; 363/21.08; 323/288

(58) Field of Classification Search ............... 363/21.01, 363/21.08, 21.1, 21.12, 21.13, 21.16, 21.18; 323/242, 243, 288, 326; 320/166
See application file for complete search history.

(56) References Cited

U.S. PATENT DOCUMENTS

| | | | | |
|---|---|---|---|---|
| 5,959,464 A | * | 9/1999 | Qualich | 324/750.06 |
| 2008/0043496 A1 | * | 2/2008 | Yang | 363/21.12 |

* cited by examiner

*Primary Examiner* — Harry Behm
*Assistant Examiner* — Matthew Grubb (57) ABSTRACT

An output regulation circuit of a power converter without current sensing loss includes a transforming circuit to receive a proportional voltage from the primary winding of the power converter during the on-time period of the power switch. The first proportional voltage is transformed to a charging current signal to charge an energy storage device. Thus, the circuit controls the power switch according to a voltage limited signal of the energy storage device.

23 Claims, 6 Drawing Sheets

OUTPUT REGULATION CIRCUIT OF A POWER CONVERTER WITHOUT CURRENT SENSING LOSS AND METHOD THEREOF

BACKGROUND OF THE INVENTION

1. Field of the Invention

The present invention relates to an output regulation circuit and more specifically relates to an output regulation circuit of a power converter without current sensing loss.

2. Description of Related Art

Resistor-based current sensing is simple, easy to use, low-cost, extremely linear, and requires no calibration. Ohm's Law states that voltage across a resistor is directly proportional to the current through it: V=IR. As a caveat, however, note that all resistors dissipate power when current passes though them. Because the dissipation produces heat that, in turn, affects the resistance, power dissipation in a sensing resistor must be carefully assessed.

Figure 1:
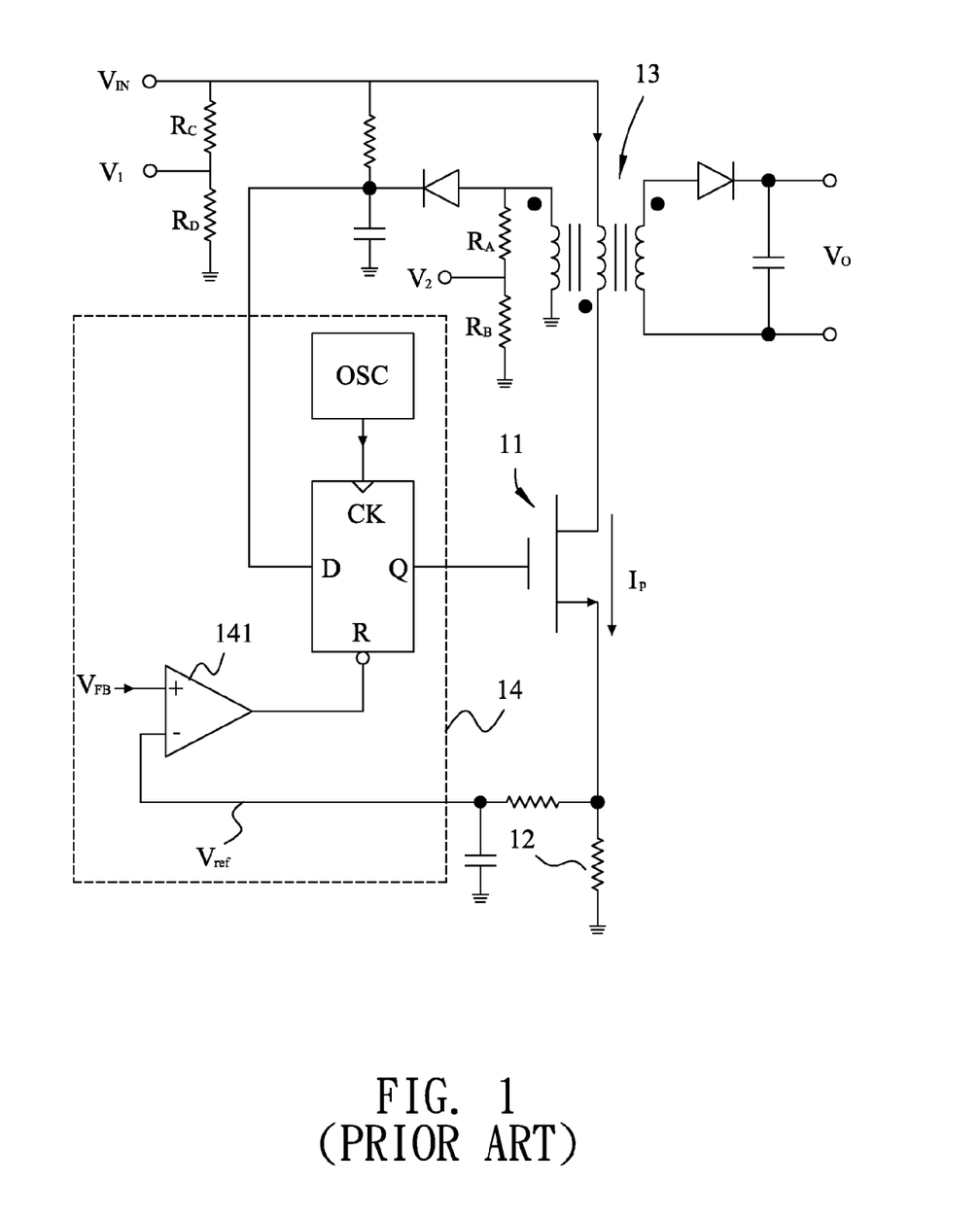
FIG. 1 shows a conventional current sensing circuit of the power converter.

FIG. 1 shows a conventional current sensing circuit of the power converter. A sensing resistor 12 is coupled to the power switch 11 of the power converter 10. In continuous conduction mode operation, when the power switch 11 enables, the input voltage excites the transformer 13. Hence, the input current $I_p$ is increased, and transforms to a voltage signal $V_{ref}$ by the sensing resistor 12. The comparator 141 of the control IC 14 receives the voltage signal $V_{ref}$ to compare with a feedback signal $V_{feb}$. When the current reaches the predetermined value, the power switch 11 disables. Until the next period, the power switch 11 will enable to output energy steady.

Due to the sensing resistor 12 exists in the main power loop, the power dissipation in the sensing resistor 12 is depends on the current. The current is greater, and the loss will increase. Therefore, a need exists for a lossless method to sense current.

SUMMARY OF THE INVENTION

An objective of the invention is to provide an output regulation circuit of a power converter without current sensing loss.

In accordance with the invention, an output regulation circuit is provided. The output regulation circuit includes a first transforming circuit and an energy storage device. The first transforming circuit receives a first proportional voltage from a primary winding of a power converter during an on-time period of the power switch. And the first transforming circuit transforms the first proportional voltage to a charging current signal. Then the charging current signal charges the energy storage device to produce a voltage limited signal, which is proportional to the switch current of the power switch, to control the power switch of the power converter.

Furthermore, the output regulation circuit further includes a second transforming circuit. The second transforming circuit receives a second proportional voltage from a auxiliary winding of the power converter during an off-time period of the power switch, and transforms the second proportional voltage to a discharging current signal. Then the energy storage device is discharged by the discharging current signal, and produces the voltage limited signal, which is proportional to output voltage of the secondary winding of the power converter, to control the power switch.

Thus, the output regulation circuit of the invention would control the power switch of the power converter without loss.

Also, without the sensing resistor of the conventional power converter, the power converter is more stable in the large power.

Moreover, the invention also provides a method for output regulation of a power converter. The method comprises a step of obtaining a charging current signal, being proportional to an input voltage of the power converter, during the on-time period of the power switch of the power converter, a step of charging an energy storage device by the charging current signal, and a step of controlling the power switch of the power converter according to a voltage limited signal of the energy storage device.

Furthermore, the method of the present invention further comprises a step of obtaining a discharging current signal, being proportional to an output voltage of the power converter, during the off-time period of the power switch of the power converter, a step of discharging the energy storage device by the discharging current signal, and a step of controlling the power switch of the power converter according to the voltage limited signal of the energy storage device.

BRIEF DESCRIPTION OF THE DRAWINGS

The present invention will become more fully understood from the detailed description given herein below illustration only, and thus are not limitative of the present invention, and wherein.

DESCRIPTION OF THE PREFERRED EMBODIMENTS

Figure 2:
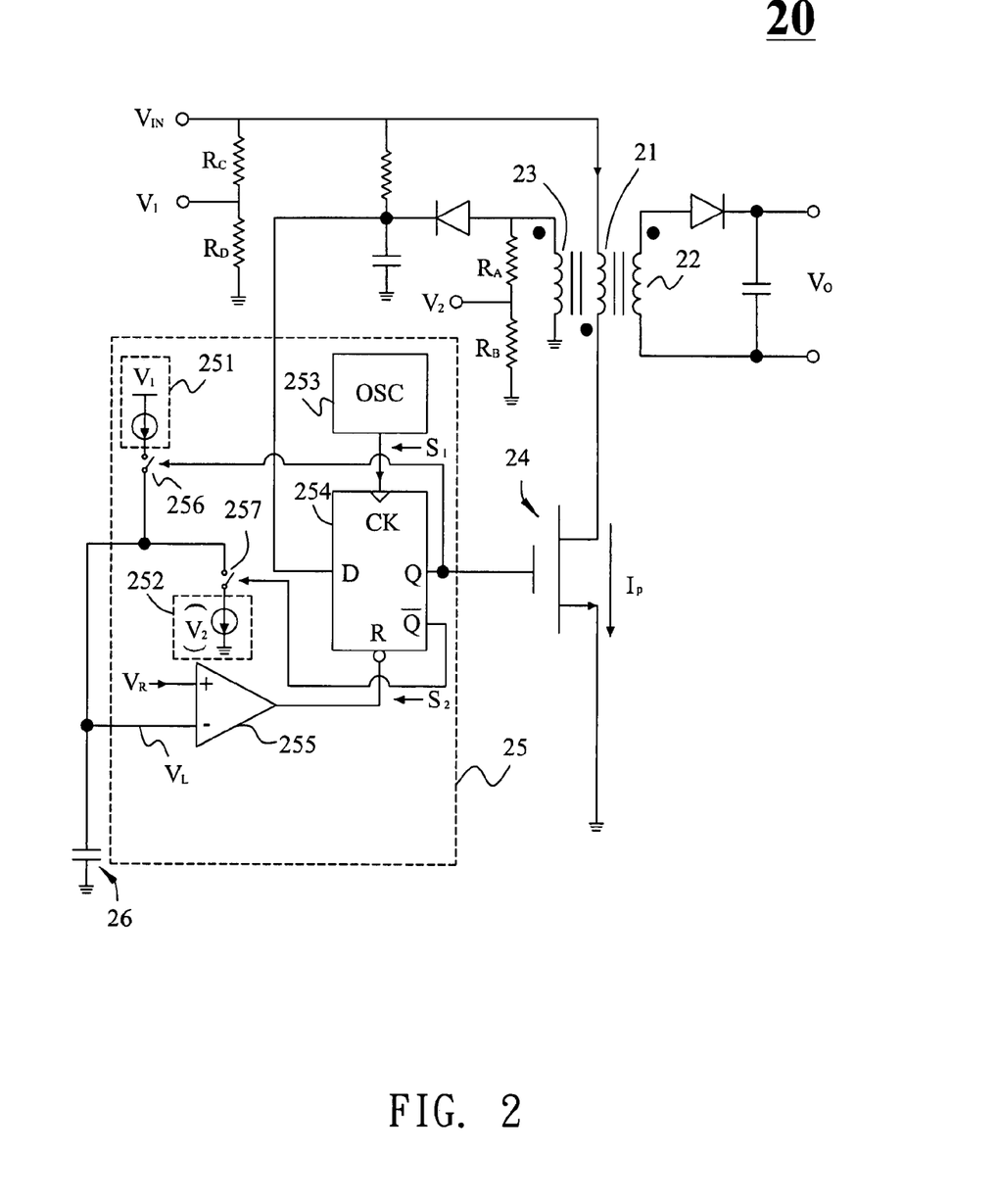
FIG. 2 is an output regulation circuit of the power converter according to present invention.

FIG. 2 shows a preferred embodiment of an output regulation circuit of the power converter according to present invention. The power converter 20 includes a primary winding 21, a secondary winding 22, an auxiliary winding 23, a power switch 24, a control circuit 25 and an energy storage device 26. The primary winding 21 receives an input voltage $V_{IN}$ and is coupled to the secondary winding 22 to induce signals in the secondary winding 22 and outputs an output voltage $V_O$. The primary winding 21 also connects to the power switch 24. The control circuit 25 connects to the primary winding 21 and the power switch 24 to control the power converter 20 by turn-on/turn-off the power switch 24. The primary winding 21 and the secondary winding 22 is inversely. During an on-time period of the power switch 24, the current of the primary winding 21 is defined as follows:

$$I_{L\text{-}on} = \frac{V_{IN}}{L} \times T_{on} \quad (1)$$

wherein $T_{on}$ is time of the power converter 20 during the on-time period; and L is inductance of the primary winding 21.

The auxiliary winding 23 and the secondary winding 22 is not inversely. During an off-time period of the power switch 24, the reflected current of the auxiliary winding 23 is defined as follows:

$$I_{L\text{-}off} = n \times \frac{V_{bus}}{L} \times T_{off} \qquad (2)$$

wherein $T_{on}$ is time of the power converter 20 during the off-time period;

L is inductance of the primary winding 21; and n is turns ratio between primary and secondary winding.

The control circuit 25 includes a first transforming circuit 251, a second transforming circuit 252, an oscillation circuit 253(OSC), a flip-flop 254 and a comparator 255. The OSC 253 is connected to the clock-input terminal CK of a flip-flop 254. The auxiliary winding 23 is connected to the D-input terminal D of the flip-flop 254. The reset-input terminal R of the flip-flop 254 is connected to the output terminal of the comparator 255. The output terminal Q of the flip-flop 254 is connected to the power switch 24 and the first transforming circuit 251. Another output terminal $\overline{Q}$ of the flip-flop 254 is connected to the second transforming circuit 252.

The first transforming circuit 251 obtains a first proportional voltage $V_1$, which is proportional to the input voltage $V_{IN}$ of the power converter 20, during the on-time period. As FIG. 2 shown, the first proportional voltage $V_1$ is divided from the input voltage $V_{IN}$ by resistors $R_C$ and $R_D$. However we can also obtain the first proportional voltage $V_1$ from any place of the power converter 20 to satisfy the first proportional voltage $V_1$ is proportional to the input voltage $V_{IN}$. Even the power converter 20 further includes a signal generator to generate the first proportional voltage $V_1$ is proper. To avoid increase the cost, the embodiment discloses obtaining the first proportional voltage $V_1$ is divided from the input voltage $V_{IN}$ by the resistors $R_C$ and $R_D$, which included in conventional power converter 20.

Figure 6:
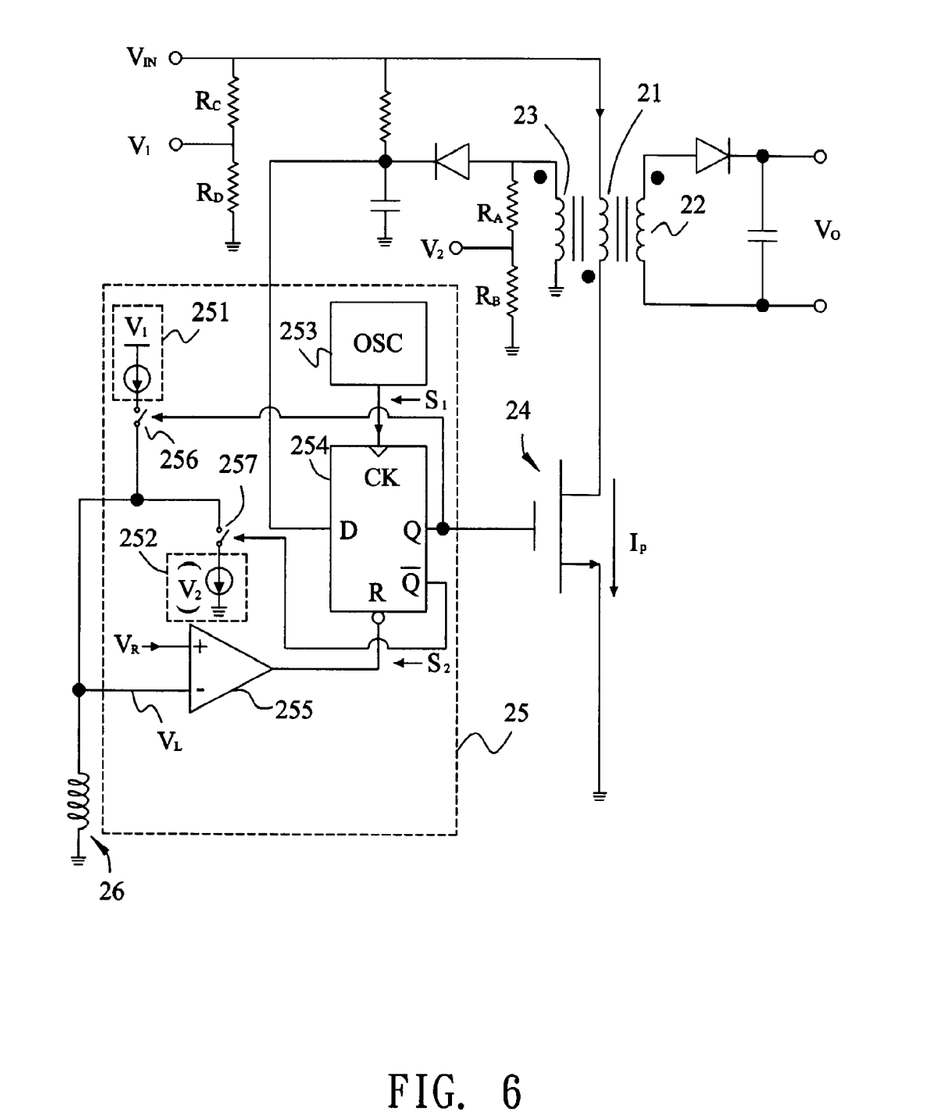
FIG. 6 is an output regulation circuit of the power converter according to present invention, which shows another embodiment of the energy storage device.

Then the first transforming circuit 251 transforms the first proportional voltage $V_1$ to a charging current signal and charges the energy storage device 26 during the on-time period. The energy storage device 26 can be an electric capacity, an inductance, see FIG. 6, or any other device can store energy. The energy storage device 26 would produce a voltage limited signal $V_L$ to the comparator 255 and compares with a reference voltage $V_R$. The D-input terminal D of the flip-flop 254 is connected to the auxiliary winding 23 to receive a fixed voltage. The clock-input terminal CK of the flip-flop 254 is connected to the OSC 253 to receive a fixed pulse wave. When the voltage limited signal $V_L$ is greater than the reference voltage $V_R$, a first switch signal $S_1$ is reset to directly control the power switch 24 of the power converter 20 without sensing resistors and current sensing loss.

The second transforming circuit 252 obtains a second proportional voltage $V_2$, which is proportional to the output voltage $V_O$ of the power converter 20, during the off-time period. As FIG. 2 shown, the second proportional voltage $V_2$ is divided from the reflected output voltage, which is proportional to the output voltage $V_O$, by resistors $R_A$ and $R_B$. However we can also obtain the second proportional voltage $V_2$ from any place of the power converter 20 to satisfy the second proportional voltage $V_2$ is proportional to the output voltage $V_O$. Even the power converter 20 further includes a signal generator to generate the second proportional voltage $V_2$ is proper. To avoid increase the cost, the embodiment discloses obtaining the second proportional voltage $V_2$ is divided from the reflected output voltage by the resistors $R_A$ and $R_B$, which included in conventional power converter 20.

Then the second transforming circuit 252 transforms the second proportional voltage $V_2$ to a discharging current signal and discharges the energy storage device 26 during the off-time period. The energy storage device 26 produces the voltage limited signal $V_L$ to the comparator 255 and compares with a reference voltage $Y_R$. The D-input terminal D of the flip-flop 254 is connected to the auxiliary winding 23 to receive a fixed voltage. The clock-input terminal CK of the flip-flop 254 is connected to the OSC 253 to receive a fixed pulse wave. When the voltage limited signal $V_L$ is greater than the reference voltage $V_R$, a second switch signal $S_2$ is reset to directly control the power switch 24 of the power converter 20 without sensing resistors and current sensing loss.

Figure 3:
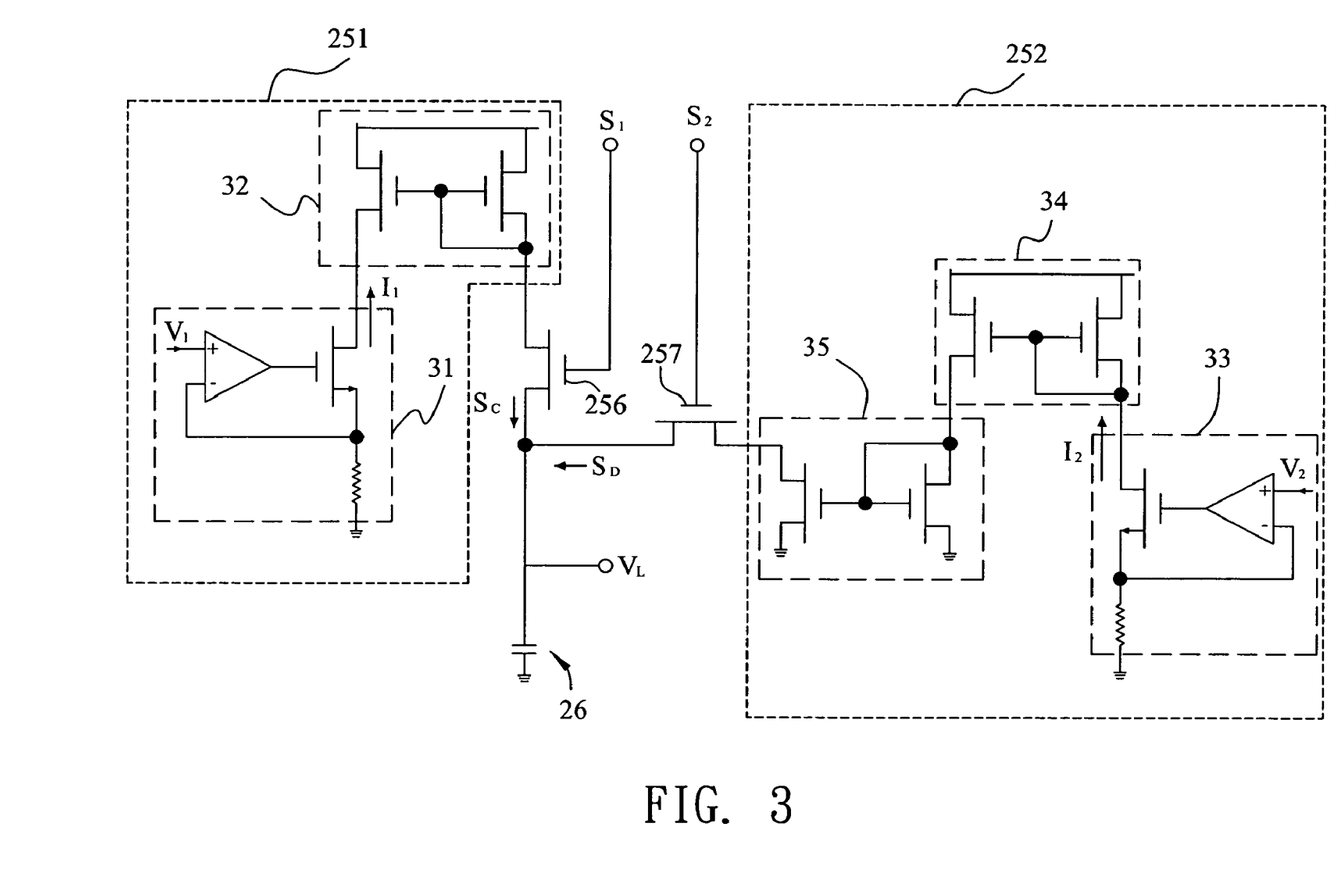
FIG. 3 shows the first and second transforming circuit in the FIG. 2.

FIG. 3 shows the first and second transforming circuit in the FIG. 2. The first transforming circuit 251 includes a first voltage-current converter 31 and a first current mirror circuit 32. The first voltage-current converter 31 transforms the first proportional voltage $V_1$ to a first current $I_1$. The first current mirror circuit 32 mirrors the first current $I_1$ to the charging current signal $S_C$ and charges the energy storage device 26. The voltage limited signal $V_L$ of the energy storage device 26 during the on-time period of the power switch is according to following equation:

$$\Delta V_{L\text{-}on} = x \times \frac{V_{IN} \times A}{C} \times \frac{T_{on}}{R_x} \qquad (3)$$

wherein x is current mirror transfer ratio;

C is capacitance of the energy storage device 26;

$V_{IN}$ is the input voltage of the power converter 20;

A is the proportion of the first proportional voltage $V_1$;

$T_{on}$ is time of the power converter 20 during the on-time period; and $R_x$ is a voltage to current conversion ratio.

In the embodiment of FIG. 2, the first proportional voltage $V_1$ is a first divided voltage of the input voltage $V_{IN}$, and the proportion A of the first proportional voltage $V_1$ is a divided ratio, $$\frac{R_C}{R_C + R_D}.$$

Comparing equations 1 and 3, the voltage limited signal $V_L$ in the energy storage device 26 is proportional to a switch current of the power switch 24. Hence, we can take the voltage limited signal $V_L$ in the energy storage device 26 to replace the switch current of the power switch 24 during the on-time period. And the voltage limited signal $V_L$ is transmitted to the comparator 255 to control the power switch 24 during the on-time period.

The second transforming circuit 252 includes a second voltage-current converter 33 and two second current mirror circuits 34, 35. The second voltage-current converter 33 transforms the second proportional voltage $V_2$ to a second current $I_2$. The second current mirror circuits 34, 35 mirror the second current $I_2$ to the discharging current signal $S_D$ and discharges the energy storage device 26. The voltage limited signal $V_L$ of the energy storage device 26 during the off-time period of the power switch is according to following equation:

$$V_{L\text{-}off} = y \times \frac{V_O \times B}{C} \times \frac{T_{off}}{R_y} \times N_x \quad (4)$$

wherein
y is current mirror transfer ratio;
C is capacitance of the energy storage device 26;
$V_O$ is the output voltage of the power converter 20;
B is the proportion of the second proportional voltage $V_2$;
$T_{off}$ is time of the power converter 20 during the off-time period;
$N_x$ is a turns ratio of the auxiliary winding 23 and the secondary winding 22; and
$R_y$ is a voltage to current conversion ratio.

In the embodiment of FIG. 2, the second proportional voltage $V_2$ is a second divided voltage of the output voltage $V_O$, and the proportion B of the first proportional voltage $V_2$ is a divided ratio, $$\frac{R_A}{R_A + R_B}.$$

Comparing equations 2 and 4, the voltage limited signal $V_L$ in the energy storage device 26 is proportional to a switch current of the power switch 24. Hence, we can take the voltage limited signal $V_L$ in the energy storage device 26 to replace the switch current of the power switch 24 during the off-time period. And the voltage limited signal $V_L$ is transmitted to the comparator 255 to control the power switch 24 during the off-time period.

Figure 4:
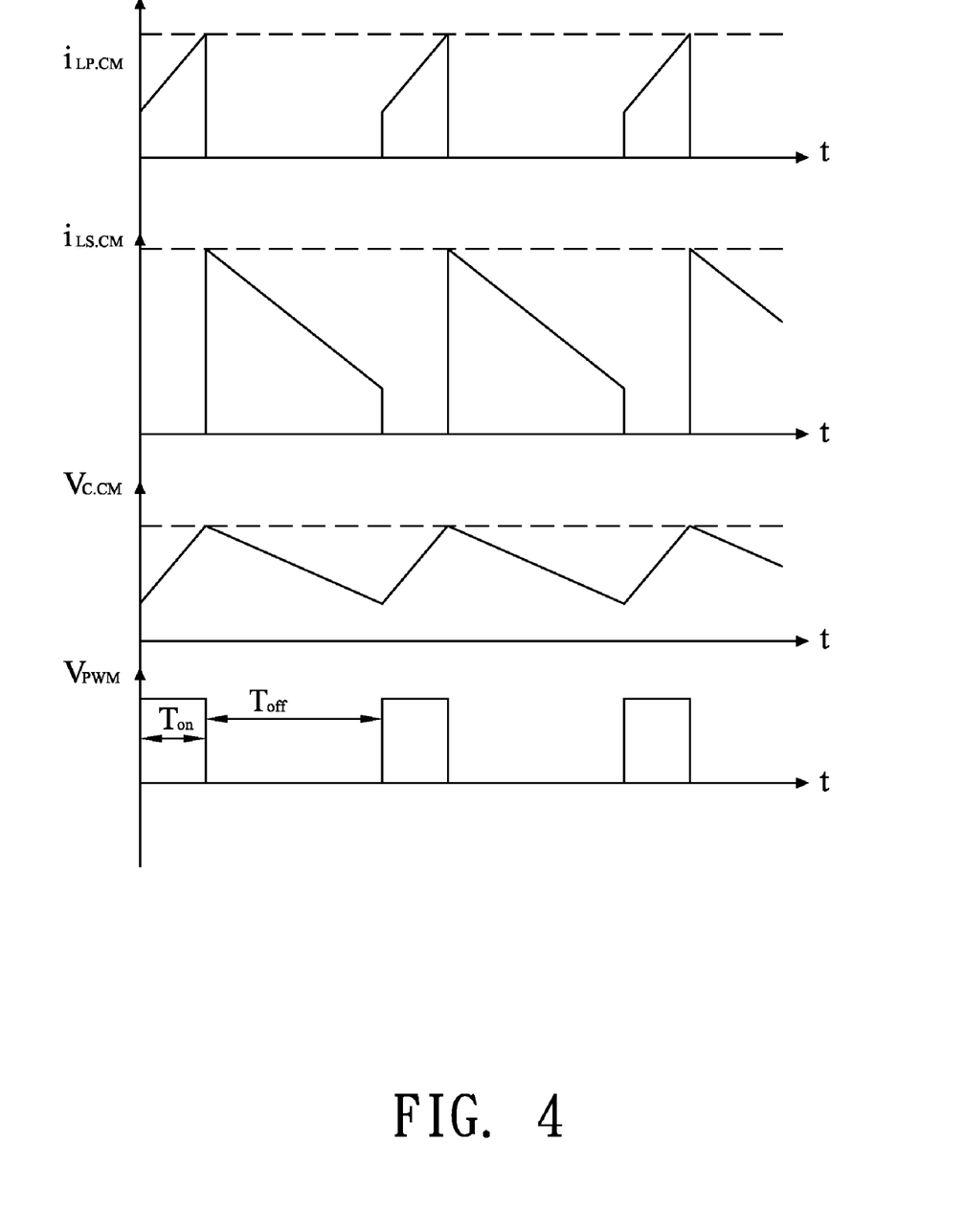
FIG. 4 displays the waveform of the present invention in continuous conduction mode operation.
Figure 5:
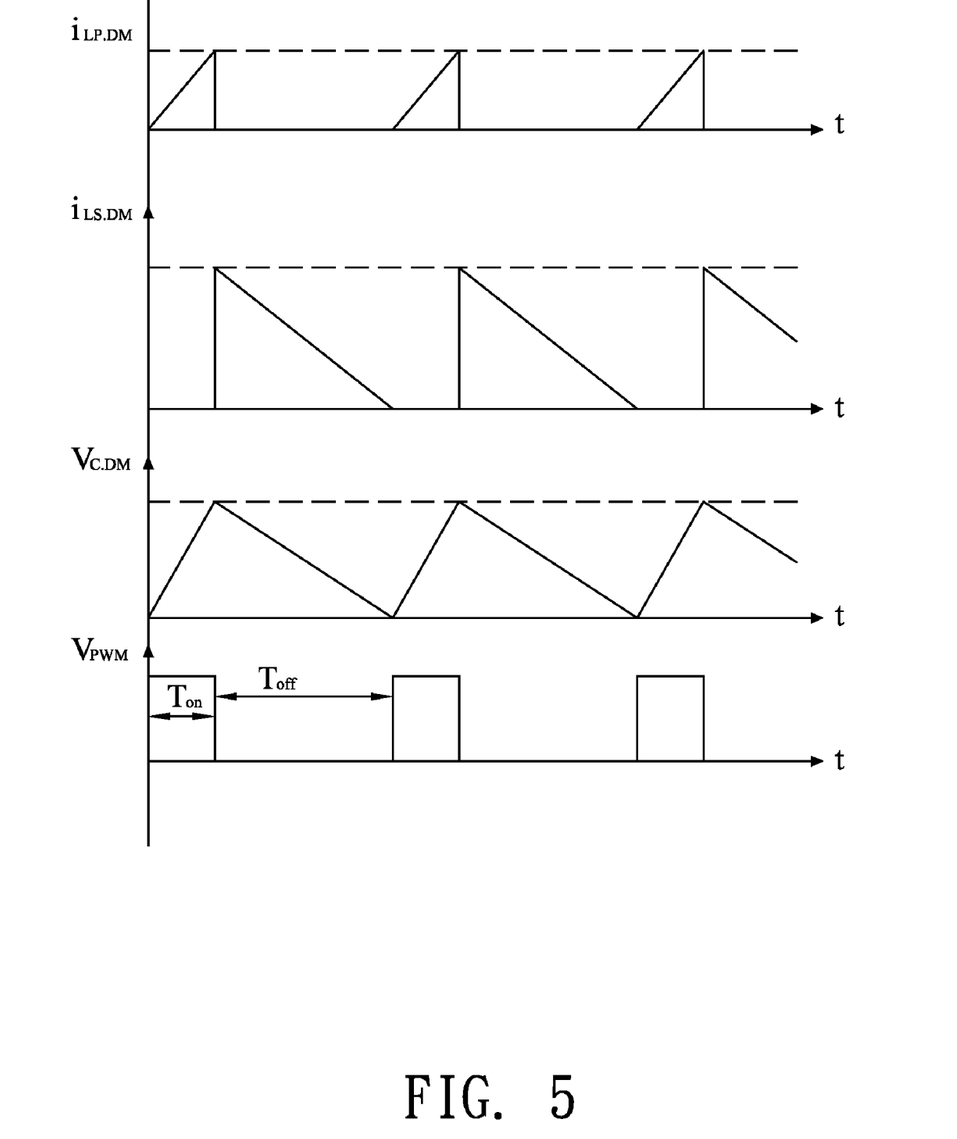
FIG. 5 displays the waveform of the present invention in discontinuous conduction mode operation.

FIG. 4 displays the waveform of the present invention in continuous conduction mode operation. And FIG. 5 displays the waveform of the present invention in discontinuous conduction mode operation. Regardless of in continuous conduction mode operation or in discontinuous conduction mode operation, we can control the power switch by the voltage limited signal $V_L$ of the energy storage device 26 by charging and discharging.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for output regulation of a power converter, the power converter including a power switch, comprising the following steps:
   obtaining a first divided voltage divided from an input voltage from a primary winding of the power converter, during an on-time period of the power switch of the power converter;
   transforming the first divided voltage to a first current;
   mirroring the first current to a charging current signal;
   charging an energy storage device by the charging current signal;
   comparing a voltage limited signal of the energy storage device with a reference voltage; and
   resetting a switch signal when the voltage limited signal is greater than the reference voltage to control the power switch of the power converter without sensing resistors, which is adapted to directly sense a switch current of the power switch, and current sensing loss
   wherein a flip-flop resets the switch signal when the voltage limited signal is greater than the reference voltage to control the power switch directly of the power converter, and the flip-flop includes a D-input terminal, a clock-input terminal, a reset-input terminal and an output terminal, the clock-input terminal is connected to an oscillation circuit, the D-input terminal is connected to an auxiliary winding of the power converter, the reset-input terminal is connected to an output terminal of a comparator, which utilized to compare the voltage limited signal and the reference voltage, and the output terminal is connected to the power switch to reset the switch signal.

2. The method of claim 1, wherein the voltage limited signal of the energy storage device during the on-time period of the power switch is according to following equation:

$$\Delta V_{L\text{-}on} = x \times \frac{V_{IN} \times A}{C} \times \frac{T_{on}}{R_x}$$

wherein
x is current mirror transfer ratio;
C is capacitance of the energy storage device;
$V_{IN}$ is an input voltage of the power converter;
A is a divided ratio of the first divided voltage;
$T_{on}$ is time of the power converter during the on-time period; and
Rx is a voltage to current conversion ratio.

3. The method of claim 1, wherein the voltage limited signal in the energy storage device is proportional to the switch current of the power switch.

4. The method of claim 1, further comprising the steps of:
   obtaining a second voltage divided from an output voltage of the power converter, during an off-time period of the power switch of the power converter;
   transforming the second divided voltage to a second current;
   mirroring the second current to a discharging current signal;
   discharging the energy storage device by the discharging current signal;
   comparing the voltage limited signal of the energy storage device with the reference voltage; and
   resetting a second switch signal when the voltage limited signal is greater than the reference voltage to control the power switch of the power converter without sensing resistors, which is adapted to directly sense the switch current of the power switch, and current sensing loss.

5. The method of claim 4, wherein the flip-flop resets the second switch signal when the voltage limited signal is greater than the reference voltage to control the power switch directly of the power converter.

6. The method of claim 5, wherein the flip-flop further includes a second output terminal and the second output terminal is connected to the power switch to reset the second switch signal.

7. The method of claim 4, wherein the voltage limited signal of energy storage device during the off-time period of the power switch is according to following equation:

$$\Delta V_{L\text{-}off} = y \times \frac{V_O \times B}{C} \times \frac{T_{off}}{R_y} \times N_x$$

wherein
y is current mirror transfer ratio;
C is capacitance of the energy storage device;
$V_O$ is an output voltage of the power converter;

B is a divided ratio the second divided voltage;
$T_{off}$ is time of the power converter during the off-time period;
Nx is a turns ratio of the auxiliary winding and the secondary winding; and
$R_y$ is a voltage to current conversion ratio.

8. The method of claim 4, wherein the voltage limited signal in the energy storage device is proportional to the output voltage of the power converter.

9. A method for output regulation of a power converter, the power converter including a power switch, comprising the following steps:
obtaining a second divided voltage divided from an output voltage from a primary winding of the power converter, during an off-time period of the power switch of the power converter;
transforming the second divided voltage to a second current;
mirroring the second current to a discharging current signal;
discharging an energy storage device by the discharging current signal;
comparing a voltage limited signal of the energy storage device with a reference voltage; and
resetting a switch signal when the voltage limited signal is greater than the reference voltage to control the power switch of the power converter without sensing resistors, which is adapted to directly sense a switch current of the power switch, and current sensing loss;
wherein a flip-flop resets the switch signal when the voltage limited signal is greater than the reference voltage to control the power switch directly of the power converter, the flip-flop includes a D-input terminal, a clock-input terminal, a reset-input terminal and an output terminal, the clock-input terminal is connected to an oscillation circuit, the D-input terminal is connected to an auxiliary winding of the power converter, the reset-input terminal is connected to an output terminal of a comparator, which utilized to compare the voltage limited signal and the reference voltage, and the output terminal is connected to the power switch to reset the switch signal.

10. The method of claim 9, wherein the voltage limited signal of energy storage device during the off-time period of the power switch is according to following equation:

$$\Delta V_{L\text{-}off} = y \times \frac{V_O \times B}{C} \times \frac{T_{off}}{R_y} \times N_x$$

wherein
y is current mirror transfer ratio;
C is capacitance of the energy storage device;
$V_O$ is an output voltage of the power converter;
B is a divided ratio the second divided voltage;
$T_{off}$ is time of the power converter during the off-time period;
Nx is a turns ratio of the auxiliary winding and the secondary winding; and
$R_y$ is a voltage to current conversion ratio.

11. A output regulation circuit of a power converter, the power converter including a primary winding, a secondary winding, an auxiliary winding and a power switch, comprising:
a first transforming circuit, receiving a first divided voltage from the primary winding of the power converter during an on-time period of the power switch, and transforming the first proportional voltage to a charging current signal;
an energy storage device, charged by the charging current signal;
a comparator, comparing a voltage limited signal of the energy storage device with a reference voltage; and
a flip-flop, including a D-input terminal, a clock-input terminal, a reset-input terminal and an output terminal, the clock-input terminal is connected to an oscillation circuit, the D-input terminal is connected to the auxiliary winding of the power converter, the reset-input terminal is connected to an output terminal of the comparator, and the output terminal is connected to the power switch to reset a switch signal when the voltage limited signal is greater than the reference voltage to directly control the power switch of the power converter without sensing resistors, which is adapted to directly sense a switch current of the power switch, and current sensing loss;
wherein the voltage limited signal is proportional to switch current of the power switch.

12. The circuit of claim 11, wherein the first transforming circuit comprises:
a first voltage-current converter, transforming the first divided voltage to a first current; and
a first current mirror circuit, mirroring the first current to the charging current signal before charging the energy storage device.

13. The circuit of claim 12, the voltage limited signal of the energy storage device during the on-time period of the power switch is according to following equation:

$$\Delta V_{L\text{-}on} = x \times \frac{V_{IN} \times A}{C} \times \frac{T_{on}}{R_x}$$

wherein
x is current mirror transfer ratio;
C is capacitance of the energy storage device;
$V_{bus}$ is an input voltage of the power converter;
A is a divided ratio of the first divided voltage;
$T_{on}$ is time of the power converter during the on-time period; and
Rx is a voltage to current conversion ratio.

14. The circuit of claim 11, wherein the energy storage device is an electric capacity.

15. The circuit of claim 11, wherein the energy storage device is an inductance.

16. The circuit of claim 11, further comprising:
a second transforming circuit, receiving a second divided voltage from the auxiliary winding of the power converter during an off-time period of the power switch, and transforming the second proportional voltage to a discharging current signal;
wherein the discharging current signal discharged the energy storage device, and the energy storage device produces the voltage limited signal, which is proportional to output voltage of the secondary winding of the power converter, the flip-flop further includes a second output terminal connected to the power switch to reset a second switch signal to directly control the power switch without sensing resistors, which is adapted to directly sense the switch current of the power switch, and current sensing loss.

17. The circuit of claim 16, wherein the second transforming circuit comprises:

a second voltage-current converter, transforming the second divided voltage to a second current; and a second current mirror circuit, mirroring the second current to a discharging current signal before discharging the energy storage device.

18. The circuit of claim 16, wherein the voltage limited signal of energy storage device during the off-time period of the power switch is according to following equation:

$$\Delta V_{L\text{-}off} = y \times \frac{V_O \times B}{C} \times \frac{T_{off}}{R_y} \times N_x$$

wherein y is current mirror transfer ratio;
C is capacitance of the energy storage device;
$V_O$ is an output voltage of the power converter;
B is a divided ratio the second divided voltage;
$T_{off}$ is time of the power converter during the off-time period;
Nx is a turns ratio of the auxiliary winding and the secondary winding; and
$R_y$ is a voltage to current conversion ratio.

19. A output regulation circuit of a power converter, the power converter including a primary winding, a secondary winding, an auxiliary winding and a power switch, comprising:

a second transforming circuit, receiving a second divided voltage from the auxiliary winding of the power converter during an off-time period of the power switch, and transforming the second proportional voltage to a discharging current signal;

an energy storage device, discharged by the discharged current signal;

a comparator, comparing a voltage limited signal of the energy storage device with a reference voltage; and a flip-flop, including a D-input terminal, a clock-input terminal, a reset-input terminal and a second output terminal, the clock-input terminal is connected to an oscillation circuit, the D-input terminal is connected to the auxiliary winding of the power converter, the reset-input terminal is connected to an output terminal of the comparator, and the second output terminal is connected to the power switch to reset a second switch signal when the voltage limited signal is greater than the reference voltage to directly control the power switch of the power converter without sensing resistors, which is adapted to directly sense a switch current of the power switch, and current sensing loss;

wherein the voltage limited signal is proportional to an output voltage of the secondary winding of the power converter.

20. The circuit of claim 19, wherein the second transforming circuit comprises:

a second voltage-current converter, transforming the second divided voltage to a second current; and a second current mirror circuit, mirroring the second current to a discharging current signal before discharging the energy storage device.

21. The circuit of claim 19, wherein the voltage limited signal of energy storage device during the off-time period of the power switch is according to following equation:

$$\Delta V_{L\text{-}off} = y \times \frac{V_O \times B}{C} \times \frac{T_{off}}{R_y} \times N_x$$

wherein y is current mirror transfer ratio;
C is capacitance of the energy storage device;
$V_O$ is an output voltage of the power converter;
B is a divided ratio the second divided voltage;
$T_{off}$ is time of the power converter during the off-time period;
Nx is a turns ratio of the auxiliary winding and the secondary winding; and
$R_y$ is a voltage to current conversion ratio.

22. The circuit of claim 19, wherein the energy storage device is an electric capacity.

23. The circuit of claim 19, wherein the energy storage device is an inductance.

* * * * *